United States Patent
Howarth et al.

(10) Patent No.: US 6,819,065 B1
(45) Date of Patent: Nov. 16, 2004

(54) DYNAMIC BRAKING OF A TAPE MOTOR

(75) Inventors: James J. Howarth, Tucson, AZ (US); James M. Karp, Tucson, AZ (US); John A. Koski, Lafayette, CO (US); Randy C. Inch, Tucson, AZ (US)

(73) Assignee: International Business Machines, (IBM) Corporation, Armonk, NY (US)

( * ) Notice: Subject to any disclaimer, the term of this patent is extended or adjusted under 35 U.S.C. 154(b) by 0 days.

(21) Appl. No.: 10/620,232

(22) Filed: Jul. 14, 2003

(51) Int. Cl.⁷ .............................................. B65H 59/38
(52) U.S. Cl. .................. 318/6; 318/7; 318/10; 318/34; 318/66; 318/87; 318/139; 318/599; 242/334.6; 242/225; 242/250; 360/74.3; 360/71
(58) Field of Search ............................ 318/6, 7, 10, 34, 318/66, 87, 139, 599; 242/334, 334.2, 334.6, 225, 250, 389; 360/74.3, 74.1, 74.2

(56) References Cited

U.S. PATENT DOCUMENTS

| | | | |
|---|---|---|---|
| 4,015,799 A | * 4/1977 | Koski et al. | 242/334.4 |
| 4,030,012 A | * 6/1977 | Buhler | 318/565 |
| 4,065,074 A | * 12/1977 | Anderson et al. | 242/331.3 |
| 4,481,449 A | 11/1984 | Rodal | |
| 4,767,970 A | 8/1988 | Rodal | |
| 4,958,111 A | * 9/1990 | Gago | 318/6 |
| 5,150,263 A | * 9/1992 | Sakamoto et al. | 360/69 |
| 5,218,490 A | * 6/1993 | Sakamoto et al. | 360/71 |
| 5,366,303 A | * 11/1994 | Barrus et al. | 400/234 |
| 5,426,355 A | 6/1995 | Zweighaft | |
| 5,731,672 A | * 3/1998 | Miyaguchi | 318/293 |
| 6,078,156 A | 6/2000 | Spurr | |
| 6,305,628 B1 | 10/2001 | Thompson et al. | |

* cited by examiner

Primary Examiner—Rina Duda
(74) Attorney, Agent, or Firm—Swanson & Bratschun, LLC

(57) ABSTRACT

An apparatus and method for the controlled dynamic braking of a DC motor in a tape transport device are provided. A PWM state device includes a plurality of state transition paths, each path having an initial state, representative of a tape profile, including a predetermined range of tape velocities, relative amounts of tape on each reel and an initial tape tension, and at least one subsequent state. When a low power event is detected, one of the state transition paths is selected, based upon a current tape profile, and an associated PWM signal is transmitted to the motor. An energy storage device provides power to the PWM state device during the low power event. The PWM signals follow the selected transition path to modulate the current generated by the motion of the motor and thereby create a decelerating force while substantially maintaining the initial tape tension.

16 Claims, 7 Drawing Sheets

DYNAMIC BRAKING OF A TAPE MOTOR

TECHNICAL FIELD

The present invention relates generally to the field of data tape transport devices and, in particular, to controlling the braking of a tape transport motor during a power failure in such a fashion as to prevent damage to the tape.

BACKGROUND ART

Designers of tape transport systems face the problem of how the transport should respond when an emergency stop of tape motion is required. Especially in high speed tape transports, it is essential to decelerate and stop tape in a safe manner when a power loss occurs or when an error is detected. In either type of situation, the servo control system governing tape motion may be disabled due to the power loss, leaving the tape to coast to a stop. However, uncontrolled tape motion may cause loose tape to be created in the tape path.

Numerous methods of stopping a tape after a power loss have been proposed. In one such method, a friction brake is engaged to stop the tape transport motors. Another method uses back-EMF from the motors to provide power to a control circuit which, in turn, provides braking control for the two transport motors. Still other methods rely on a back-up power supply, such as a battery, to provide power for the control circuit in the event of a power failure.

When tape is moving at high speed, such as during rewind, locate to a file, or read and write operations, a powerloss may cause high tape tension to develop, resulting in tape damage. As previously noted, loose tape in the tape path may also occur during a power loss. Excess tape tension or loose tape both increase the risk of tape damage during the emergency stop or during a subsequent recovery of the tape transport to unload the tape carrier. Physical damage to the tape may result in the undesirable loss of customer data recorded on the tape.

Additionally, certain events, not related to power loss, may necessitate the shut down of a tape transport. Such problems may include a controller firmware glitch, detection of a problem with the tape tension or an unexpected reboot of the microprocessor or controller.

Thus, there remains a need for a system and method to control the deceleration of tape drive motors in the event of a power failure in any of the several voltages which may supply power to any circuit used to control the tape drive motors. There also remains a need for a system and method to control the deceleration of tape drive motors upon detection of non-power related emergency events. Importantly, such a system and method should maintain the tension of the tape media within manufacturers specification during the deceleration of tape drive motors in order to prevent damage to the tape.

SUMMARY OF THE INVENTION

The present invention provides an apparatus and method for the controlled dynamic braking of a DC motor in a tape transport device. The apparatus includes a power-fail detection circuit coupled to detect a low power event in any of at least one primary power supply, pulse width modulation (PWM) state device and an energy storage device to power the PWM state device during a low power event. The PWM state device includes a plurality of state transition paths. Each path has an initial state, representative of a tape profile, including a predetermined range of tape velocities, relative amounts of tape on each reel, an initial tape tension, and at least one subsequent state. A first input to the PWM state device receives a trigger signal from the power-fail detection circuit and a second input receives a profile signal indicative of the present tape profile. When a low power event is detected, one of the state transition paths is selected and an associated PWM signal is transmitted to the motor. The PWM signals follow the selected transition path to modulate the current generated by the motion of the motor and thereby create a decelerating force while substantially maintaining the initial tape tension.

In one embodiment, the PWM state device is coupled to, and receives control signals from, a control register. The control register may receive signals, such as the profile signal, from a microprocessor. Moreover, when the motor control circuit includes a power switch (such as an FET) for each motor winding, the PWM signal modulates the power switches to sink motor-generated current to create the decelerating force.

In another embodiment, controlled dynamic braking may be initiated by the microprocessor in the absence of a low power event.

DETAILED DESCRIPTION OF THE PREFERRED EMBODIMENT

Figure 1:
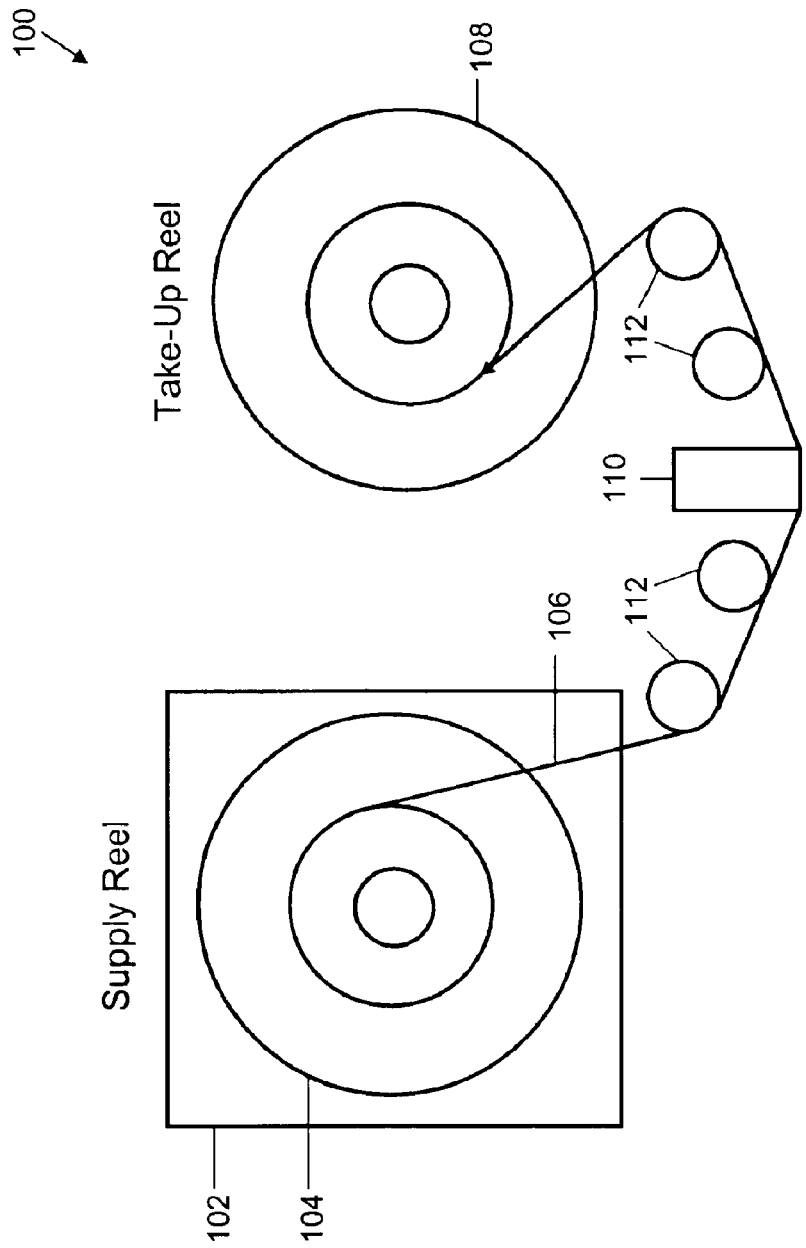
FIG. 1 is a block diagram illustrating the tape path in a tape transport system.

FIG. 1 is a block diagram illustrating the tape path of an exemplary tape transport system 100. The tape transport system 100 illustrated in FIG. 1 accepts a tape cartridge 102 containing a reel 104 on which is wound a length of tape 106. The tape transport system 100 includes a second reel 108, at least one tape head 110 and guide rollers 112. When the cartridge 102 is inserted into the tape transport system 100, the tape 106 is automatically threaded around the rollers 112, across the tape head 110 and onto the second reel 108. Motors (not shown) operatively coupled to the reels 104 and 108 pull the tape 106 across the tape head 110 which reads/writes information from/to the tape in a known manner. The motors may also move the tape 106 from one reel to another at high speed in fast forward and rewind operations. All tape operations may occur with the tape 106 moving in either direction. Thus, either reel 104 or 108 may serve as the supply reel or the take-up reel, depending upon the direction of the tape 106. In FIG. 1, the reel 104 within the cartridge 102 is shown serving as the tape supply reel while the second reel 108 is shown serving as the take-up reel. In this disclosure, the term "supply reel" refers to the reel operating as the supply reel at the present time and the term "take-up reel" refers to the reel operating as the take-up reel at the present time. Moreover, the terms "supply motor" and "take-up motor" refer to the motors operatively coupled to the supply and take-up reels, respectively.

The type of tape transport system 100 shown in FIG. 1 is for illustrative purposes only and that the invention may be employed with other types of transport systems.

Figure 2:
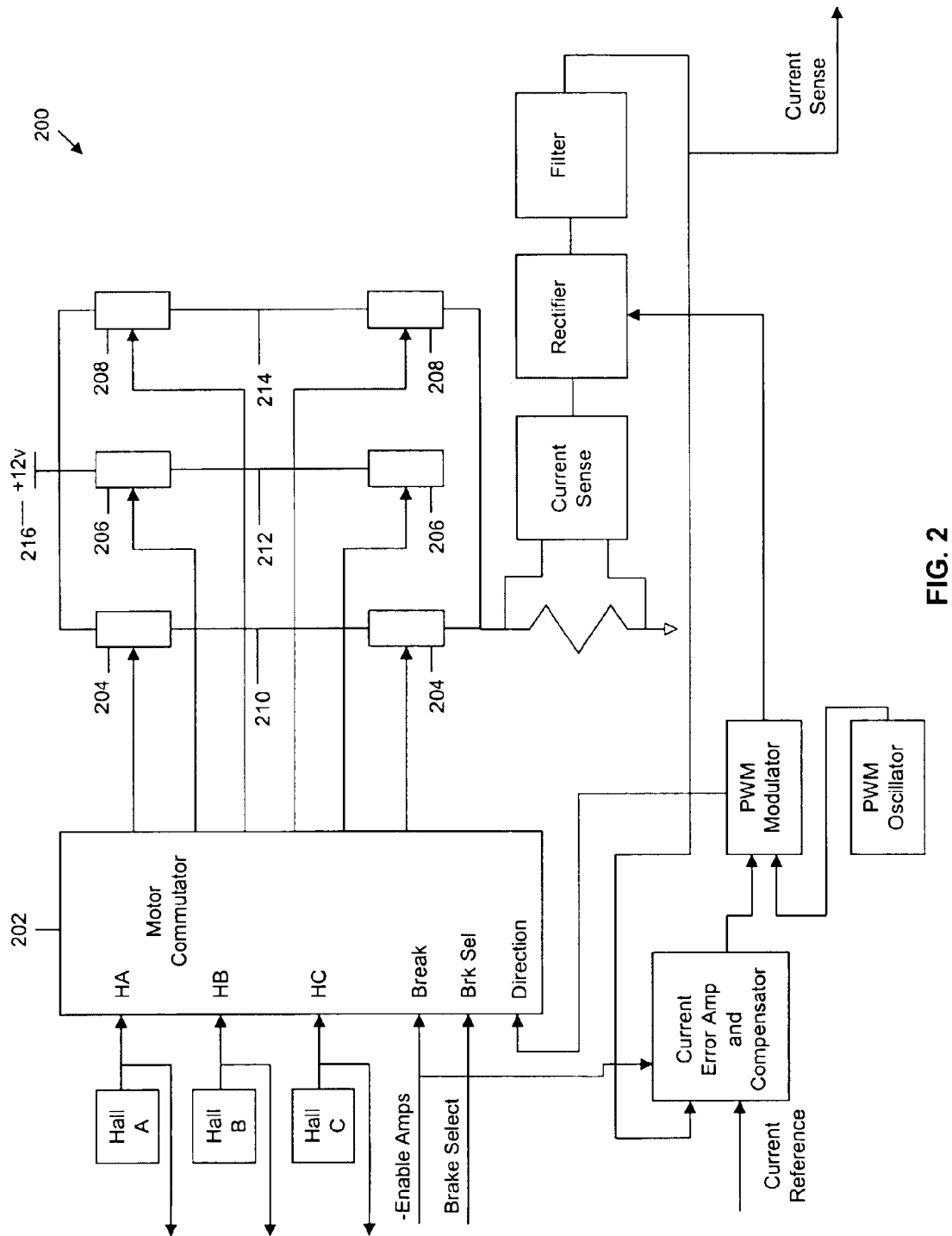
FIG. 2 is a block diagram of a DC motor control circuit.

FIG. 2 is a block diagram of a motor control or driver circuit 200 for brushless DC motors coupled to the reels 104 and 108. A commutator 202 provides gate control for a set of power switches, such as FET switches 204, 206 and 208, which, in turn, connect/disconnect the motor windings 210, 212 and 214 to/from a motor power supply 216.

Figure 3:
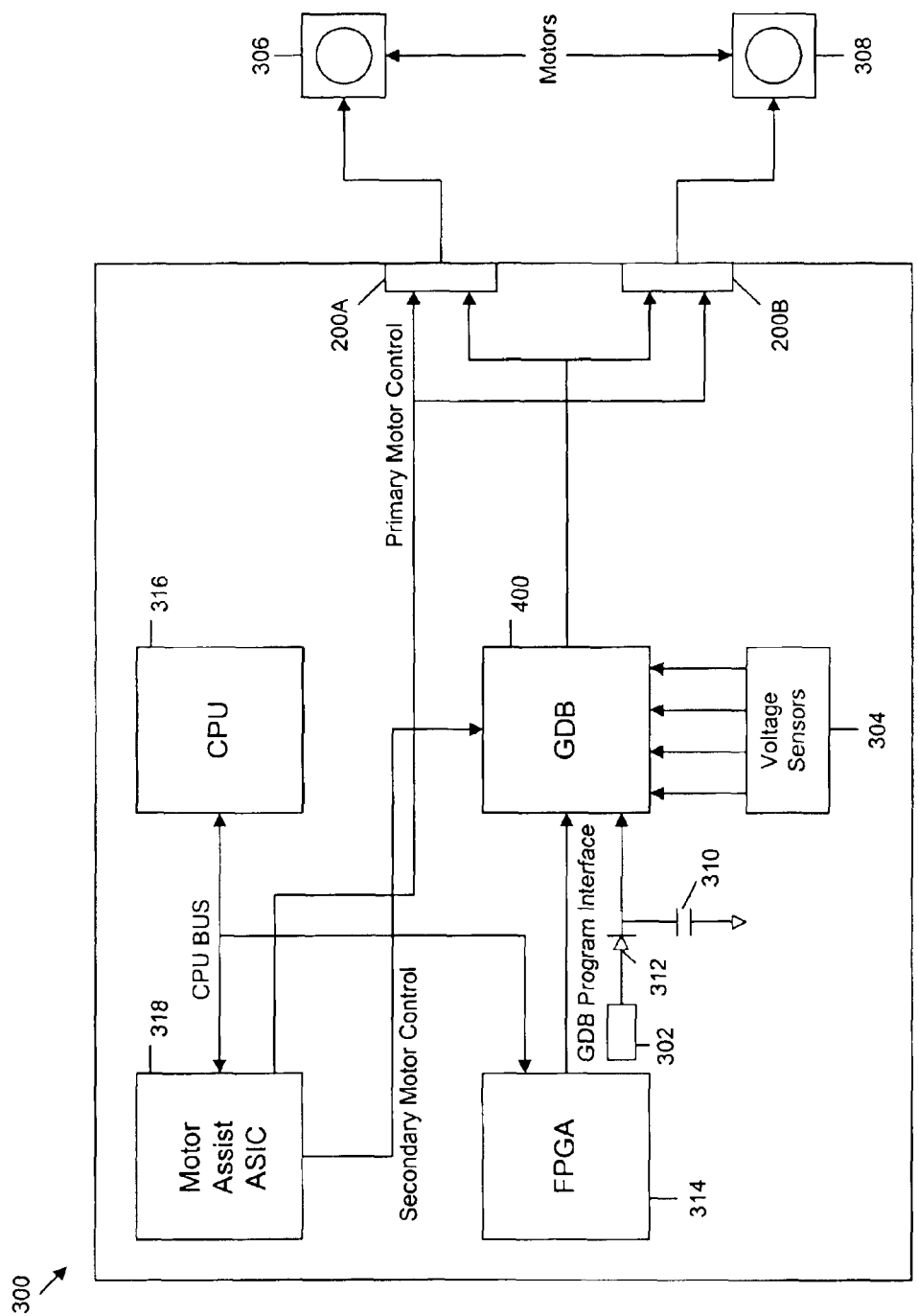
FIG. 3 is a block diagram of a tape system of the present invention.

FIG. 3 is a block diagram of a tape system 300 of in which the braking control of the present invention may be incorporated. The system 300 includes one or more primary power sources, collectively identified as 302, and power loss detection logic 304. In some tape systems, a motor controller module may require power sources to provide a variety of voltage levels, such as 2.0V, 3.3V, 5V and 12V, among others, to provide power to different portions of the module. Thus, the voltage sensor 304 is coupled to all of the primary voltage sources 302 and detects a low (or zero) voltage in any of the sources 302. Motor driver circuits 200A and 200B are coupled to the two reel motors 306 and 308, respectively. Additional control circuitry GDB (graceful dynamic brake) 400 to control dynamic braking is coupled to the motor driver circuitry 200. The system 300 also includes a secondary power source, such as a capacitor 310, which remains charged during normal operation of the system 300 but which has sufficient capacity to provide power for the control circuitry 400 in the event of a power failure or other voltage anomaly (generally referred to herein as a "low power event"). A diode 312, or a functional equivalent, isolates the secondary power source 310 and control circuitry 400 from the primary power sources 302 during a low power event. A field programmable gate array 314 provides a program interface between the control circuitry 400 and a microprocessor 316. Control of the motor drive circuits 200A and 200B may be provided by an ASIC 318 which is also coupled to the microprocessor 316 and may also provide signals to the control circuitry 400.

Figure 4:
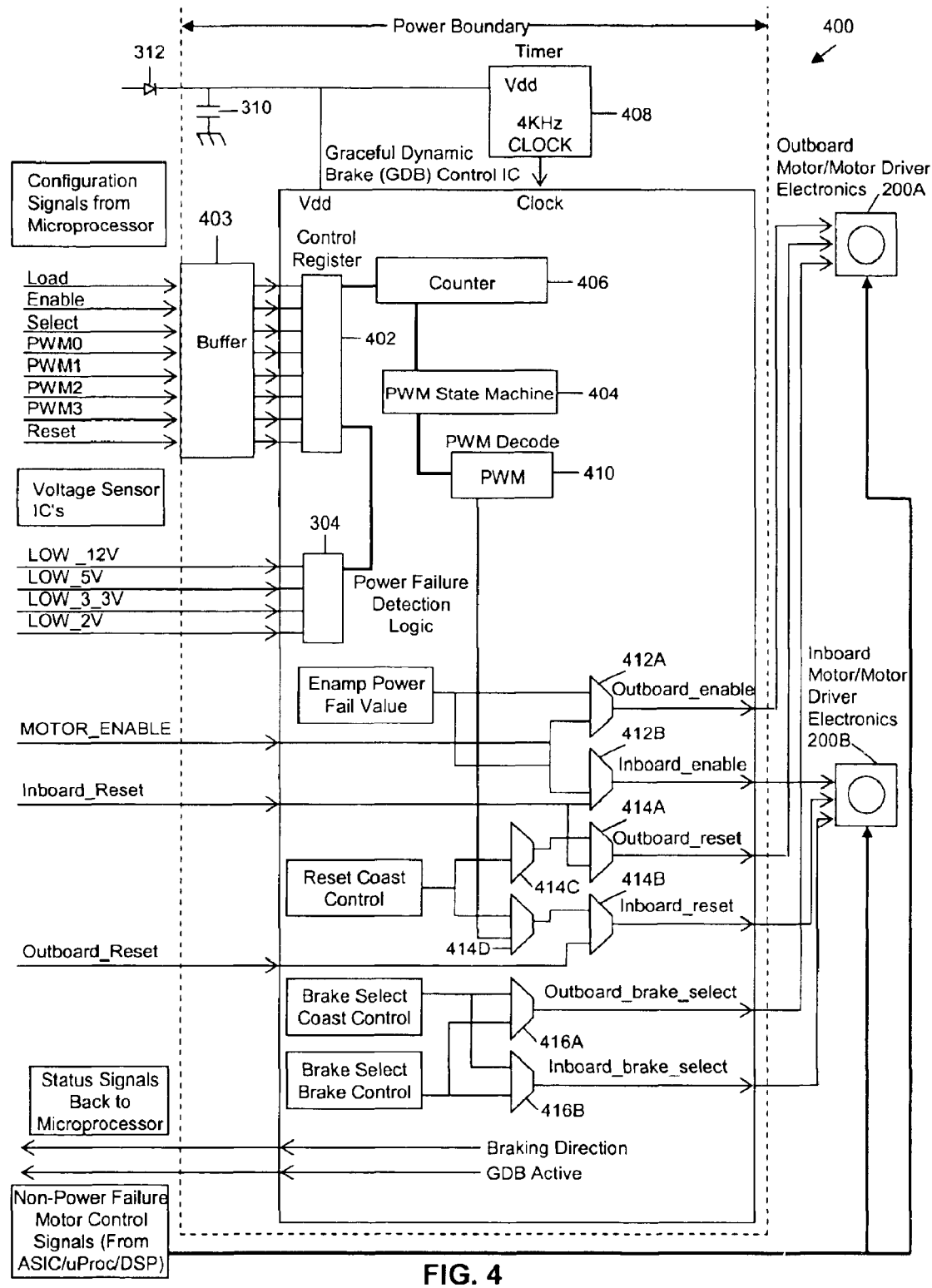
FIG. 4 is a block diagram of a dynamic brake circuit of the present invention.

FIG. 4 illustrates a more detailed block diagram of the dynamic brake circuitry 400 of the present invention. The circuitry 400 includes the power loss detection logic 304 which is coupled to sensors which detect low voltage in any of the primary power sources 302. A control register 402 stores information representing the profile of the tape 106, based upon its velocity and the relative amount of tape (the tape volume) on each reel 104 and 108 and the tape tension. The information in the control register 402 is periodically or continually updated through inputs PWM0–PWM3 so that the information represents the present tape profile. A SELECT input to the control register 402 indicates which tape reel 104 or 108 is the present supply reel. An ENABLE input provides a signal to initiate a non-power-loss related braking operation. These configuration inputs to the control register 402 are generated by the microprocessor 316 and are preferably buffered by a buffer 403 to isolate the control register from the microprocessor 316 during a low power event, thus protecting the contents of the control register 402.

A state machine 404 is programmed with at least one state transition path for establishing pulse width modulation (PWM) duty cycles for the power switches 204, 206 and 208 to enable the supply reel to be brought to a controlled stop. Each path has an initial state, representative of a tape profile, including a predetermined range of tape velocities, relative amounts of tape on each reel, an initial tape tension; each path has at least one subsequent state. In one embodiment, the state machine is programmed with four state transition paths, each having four states. Thus, a different transition path may be selected and PWM duty cycles or rates applied depending upon the tape profile (speed and relative tape volume on a supply reel, both of which affect the tape tension after a loss of power) at the time a low power event occurs. The current tape profile is continually compared by code to the range of velocities, relative amounts of tape on each reel, and an initial tape tension represented by the initial states stored in the state machine 404. The state transition path having an initial state most closely corresponding to the current tape profile is chosen and PWM signals generated form the selected path are transmitted to the motor driver 200 for the supply reel motor when a low power even occurs. At pre-programmed times, the state machine 404 steps through the balance of the state transitions to provide a different PWM rate to the motor driver to dynamically brake the supply reel. Preferably, the final PWM rate is at a substantially 100% duty cycle.

The timing of the state changes within the state machine 404 is controlled by a counter 406. The counter 406 is programmed to trigger transitions in the state machine 404 based on a best fit to an ideal data curve. A timer, such as a low frequency timer, 408 provides clocking to the counter 406 and other components of the dynamic brake circuitry 400. A PWM decoder 410 is coupled to the PWM state machine 404 to decode the state values output from the state machine 404 into practical PWM rates based on the best fit to the ideal data curve.

The output stage of the dynamic brake circuitry 400 includes several output switches, such as multiplexers 412A-B, 414A-D and 416A-B, which are controlled by the SELECT bit in the control register 402 and the power failure detection bit. The multiplexers are used to switch the motor driver circuits 200A and 200B from the non-power loss event mode to dynamic brake circuitry 400 control during a power loss event. The ENABLE signals from multiplexers 412A and 412B, for the two reel motors designated outboard and inboard motors respectively, indicates the status of the braking mode (non-power loss event or power loss event). The BRAKE_SELECT signals from the multiplexers 416A and 416B designate which of the two motors is the supply reel motor to which dynamic braking is to be applied. And, the RESET signals from the multiplexers 414A and 414B transmit the actual PWM signal from the PWM decoder 410 to the selected motor drive circuitry, 200A or 200B. The PWM signal output from the PWM decoder 410 through the multiplexers 414A and 414B are used to turn on the sink side FET power switches'gate voltages to sink the current generated by the decelerating supply motor, creating a controlled braking force. Status signals from the dynamic brake circuitry 400, such as braking direction and braking active signals, may be transmitted back to the microprocessor 316.

Figure 5:
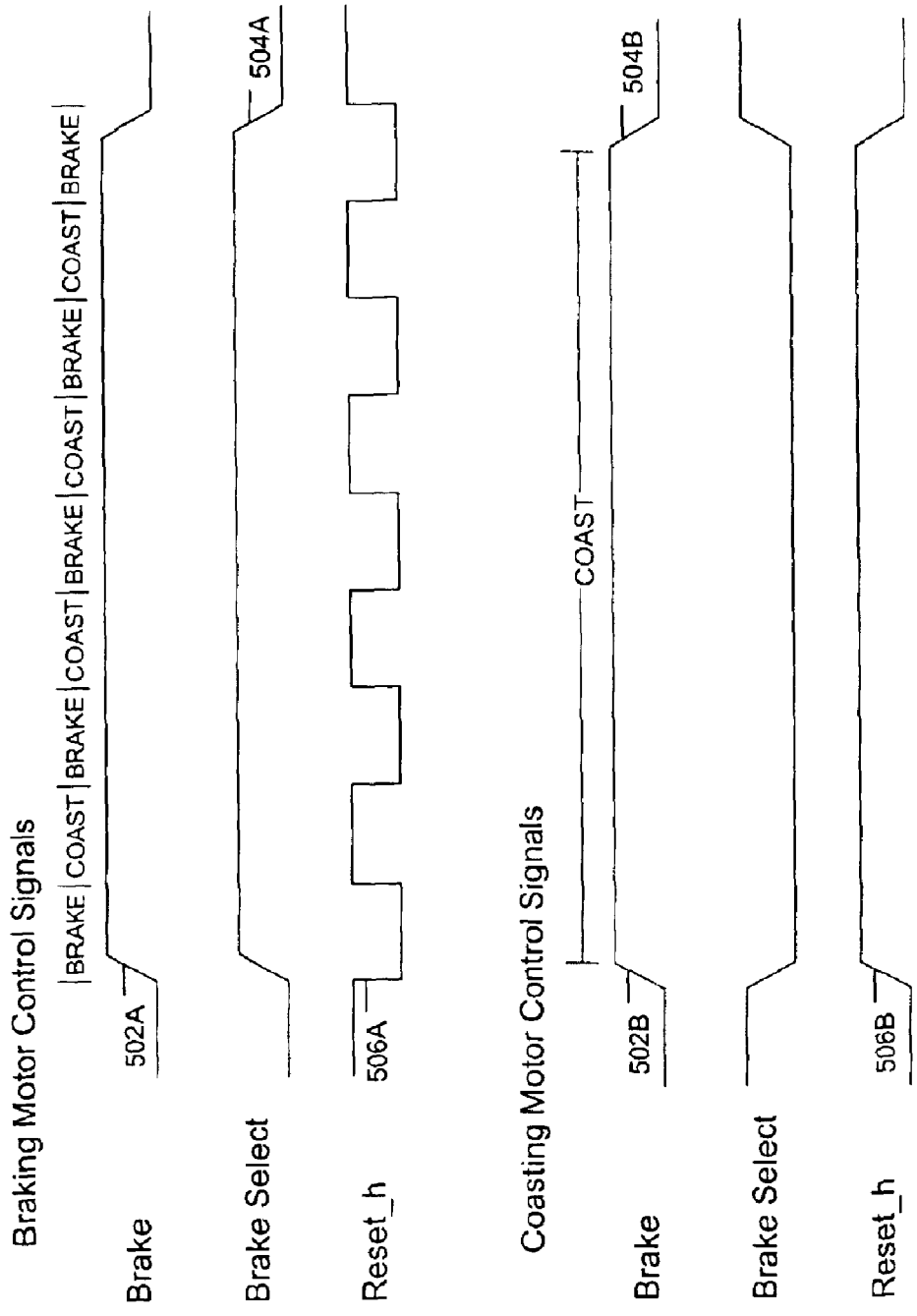
FIG. 5 is a timing diagram of signals transmitted to the braking and coasting motors from the dynamic brake circuit of the present invention.

FIG. 5 is plot of signals transmitted to the motor control drivers 200A and 200B during an exemplary dynamic braking operation. Depending on which motor is driving the tape supply reel, one of the motors will be designated the braking motor and the other designated the coasting motor. When a power loss event is detected, the BRAKE signal 502A and 502B to both motors will go high. Simultaneously, the BRAKE_SELECT signal 504A to the braking motor control driver will go high, indicating that it is the braking motor, while the BRAKE_SELECT signal 504B to the coasting motor control driver will go low, indicating that it is the coasting motor. The PWM signal is transmitted to the braking motor control circuit through the RESET signal 506A to modulate the sinking of current generated by the supply/braking motor; the RESET signal 506B to the coasting motor control circuit remains low. The terms "high" and "low" are used merely to illustrate the two states of the digital signals transmitted to the motor control drivers 200A and 200B; it will be appreciated that the actual states may be different.

Figure 6:
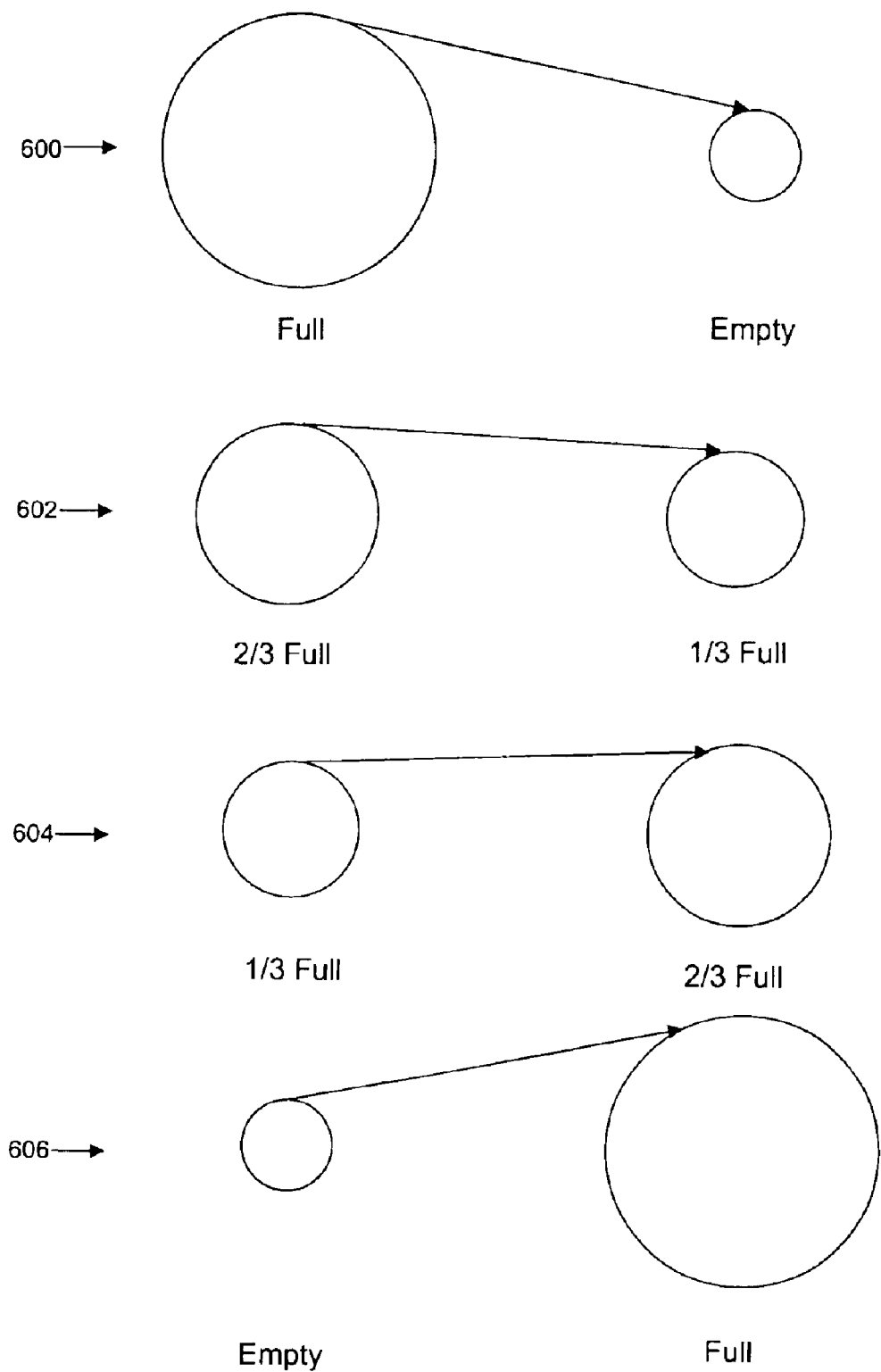
FIG. 6 schematically illustrates four initial tape profiles.

FIG. 6 illustrates the relative tape volumes for the four initial tape profiles programmed into the state machine 404. A greater number of initial profiles and subsequent state transition paths may be programmed into the state machine 404 to provide a greater degree of accuracy but at the cost of additional complexity. Fewer profiles and state transition paths may be programmed to provide lesser complexity but at the cost of a lesser degree of accuracy. Other factors may also be considered. The number of state transition paths chosen (four) and the number of state transitions in each path (also four) provides a satisfactory compromise of the competing factors but the scope of the present invention is not limited upon any specific number of paths or states. In the first profile 600, the supply reel is full; in the second profile 602, the supply reel is ⅔ full; in the third profile 604, the supply reel is ⅓ full; and in the fourth profile 606, the supply reel is substantially empty. As previously noted, each profile (tape velocity and relative reel volume) has an associated tape tension which should be substantially maintained throughout the dynamic braking process in order to prevent loose tape or tape damage due to excessively high tension.

Figure 7:
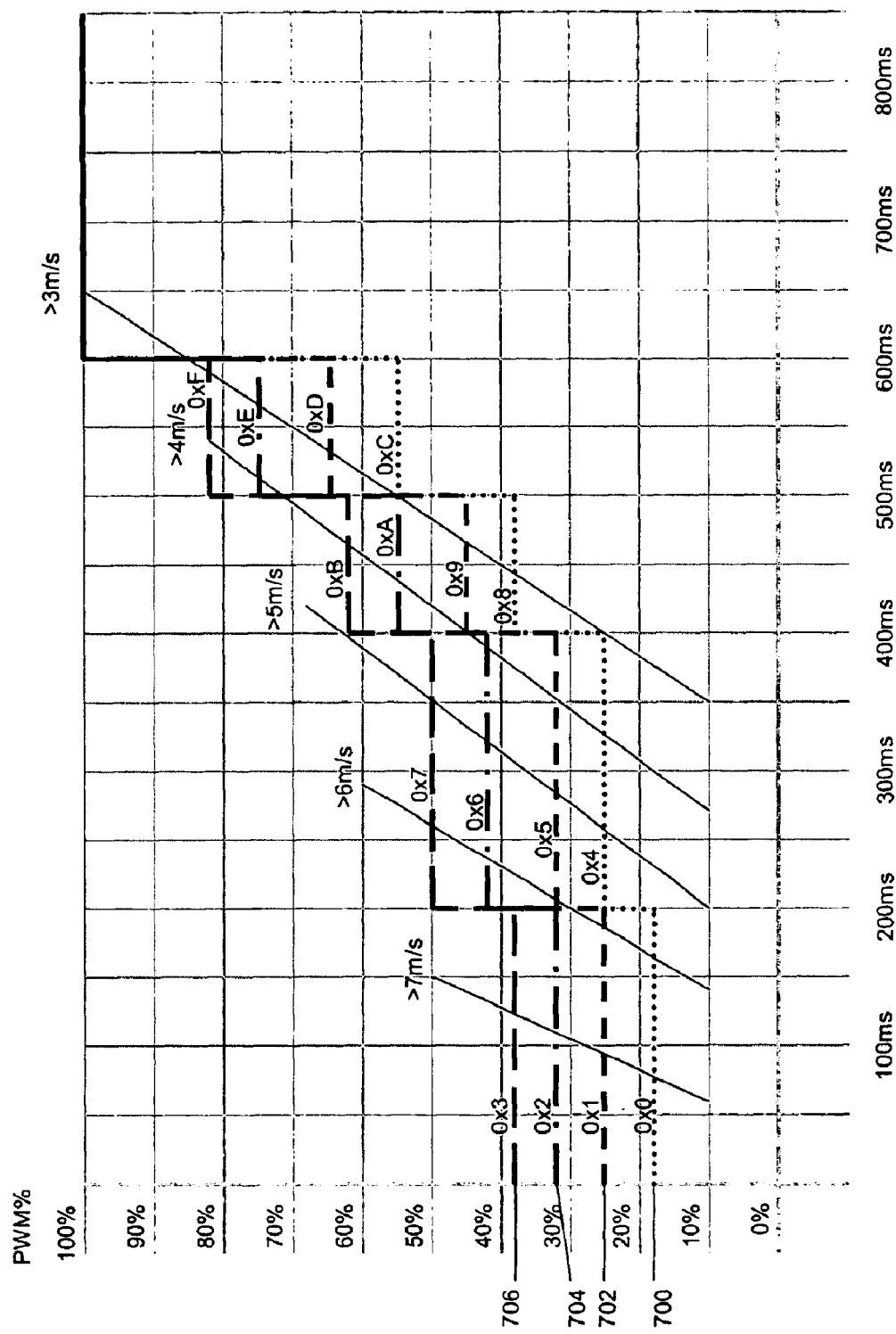
FIG. 7 is a plot of four state transition paths corresponding to the four initial tape profiles illustrated in FIG. 6.

FIG. 7 is a plot of four exemplary state transition paths 700, 702, 704 and 706 having initial states corresponding to the four initial profiles illustrated in FIG. 6. The vertical axis represents the PWM rate (duty cycle) and the horizontal axis represents the amount of time, in milliseconds, from one state transition to the next. For example, if the supply/brake reel is ⅔ full (the second profile 602) and the tape velocity is greater than 7 meters/second, the initial PWM rate will be approximately 25% and extend for approximately 200 ms. Following the second path 702, the PWM rate will increase to approximately 31% for 200 ms. Again, following the second path 702, the PWM rate will increase to approximately 44% for 100 ms, then increase to approximately 68% for the next 100 ms, and finally increase to approximately 100% until the supply/brake reel has come to a stop. The five diagonal lines represent the range of approximate tape velocities, in meters per second, at which the supply/braking reel is rotating. The number of transition paths, the number of states, the length of time in each state and the PWM rates may be determined through modeling and/or experimentation. The parameters illustrated in FIG. 7 and disclosed herein have been found to adequately fit an ideal curve, allowing for controlled deceleration without damage to the tape media.

To summarize, the microprocessor, under the control of software or, preferably, pre-programmed firmware instructions, executes the instructions as follows:

1. Code first determines in which direction the tape is moving and determines which motor is the supply motor (which will become the braking motor during a low power event).
2. Code determines the velocity in which the supply motor is rotating.
3. Code determines the volume of tape which is on the supply reel.
4. Based on the available ranges of velocity and volume of tape, code transmits a value into the control register 402 based on the table of PWM initial states and register write sequences programmed into the state machine 404.
5. If a change in direction, velocity or tape volume of tape occurs, then steps 1–4 are performed again to keep the data in the control register 402 current.
6. If a power failure or other anomaly occurs, such as due to loss of externally supplied power to the tape drive system or due to a malfunction of any of the voltages, the back-up power source 310 provides power to the dynamic brake circuitry 400. Controlled dynamic braking operation is initiated to bring all motion of the tape in the tape path to a stop while substantially maintaining the initial tape tension, thereby preventing tape damage.
7. If all drive power is lost, then drive code upon the next power up performs a recovery operation to unwind the tape and eject the cartridge, if one of the main card voltages fails. Depending on which voltage failed, the code may be able to monitor the operation of the dynamic brake circuitry 400 by examining the active signal output from the dynamic brake circuitry 400 and then providing this information to an operator or external control device. However, external intervention from an operator or software may still be required to either perform a power cycle to the drive to remedy the power failure problem, or to repair or replace the main card. In either case, tape media is maintained in the path without any excess tape in the tape path, and media may be removed from the drive once power is restored.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. An apparatus for the controlled dynamic braking of a first DC motor operating as a tape supply motor in a tape transport device and coupled to a supply-motor control circuit, the apparatus comprising:

a power-fail detection circuit for detecting a low power event in any of at least one primary power supply providing power to the supply-motor control circuit;

a pulse width modulation (PWM) state device, comprising:

a plurality of state transition paths, each path having an initial state representative of a predetermined range of tape velocities, relative amounts of tape on each reel, an initial tape tension, and at least one subsequent state;

a first input coupled to receive a trigger signal from the power-fail detection circuit indicative of a low power event;

a second input coupled to receive a profile signal indicative of a present tape profile; and an output for transmitting a PWM signal to the supply-motor control circuit; and an energy storage device coupled to provide power to the PWM state device during a low power event;

wherein:

upon receipt of the trigger signal and in response to the profile signal, one of the plurality of state transition paths is selected and an associated PWM signal, following the selected state transition path, is transmitted to the supply-motor control circuit; and current generated by the motion of the tape supply motor is selectively sunk in accordance with the transmitted PWM signal, thereby creating a decelerating force while substantially maintaining the initial tape tension.

2. The apparatus of claim 1, wherein the initial tape tension is determined from at least one of a tape velocity and a relative volume of tape on a tape reel.

3. The apparatus of claim 1, further comprising a control register coupled to the PWM state device and operable to receive control signals comprising:

state signals indicative of a present tape profile;

a load signal operable to latch the control signals into the control register.

4. The apparatus of claim 3, the control signals further comprising an enable signal to trigger dynamic braking of the tape supply motor in the absence of a low power event.

5. The apparatus of claim 4, wherein the control signals are transmitted by a microprocessor.

6. The apparatus of claim 3, wherein:

the control signals are transmitted by a microprocessor; and the apparatus further comprises a buffer coupled between the microprocessor and the PWM state device for protecting contents of the control register against alteration in the event of a low power event.

7. The apparatus of claim 3, the tape transport device further including a second DC motor operating as a tape take-up motor coupled to a take-up-motor control circuit, wherein:

the apparatus further comprises means for determining which of the first and second DC motors is operating as the tape supply motor; and the control register is further operable to receive a motor-select signal indicative of which DC motor is the tape supply motor.

8. The apparatus of claim 1, wherein:

the supply-motor control circuit comprises a power switch for each winding of the tape supply motor; and the PWM signal modulates the power switches.

9. A magnetic tape drive, comprising:

a tape head for detecting information magnetically encoded on a tape medium;

first and second tape reel motors for transporting the tape medium across the tape head, wherein:

the tape moves in a forward direction when the first motor is operable as a tape supply motor and the second motor is operable as a tape take-up motor; and the tape moves in a reverse direction when the first motor is operable as the tape take-up motor and the second motor is operable as the tape supply motor;

first and second motor control circuits coupled respectively to drive the first and second tape reel motors, each motor control circuit including a plurality of power switches operatively coupled to a corresponding plurality of motor windings;

at least one primary power supply couple to provide current to the first and second motor control circuits;

a control register operable to receive control signals comprising:

a plurality of configuration signals collectively indicative of a present tape profile, including a tape velocity, relative amounts of tape on each reel and an initial tape tension;

a motor-select signal indicative of which of the first and second motors is presently operable as the tape supply motor;

a pulse width modulation (PWM) state device, comprising:

a plurality of state transition paths stored within the PWM state device, each path having an initial state representative of a tape profile, and at least one subsequent state;

a first input coupled to receive a trigger signal from the power-fail detection circuit indicative of a low power event;

a second input coupled to receive a profile signal indicative of a present tape profile; and an output for transmitting a PWM signal to the supply-motor control circuit coupled to the present tape supply motor;

external programming interface for transmitting a load signal to the control register when a low power event in any of the at least one primary power supplies is detected, wherein the control signals are latched into the control register;

an energy storage device coupled to provide power to the PWM state device during a low power event;

first and second switching devices operatively coupled respectively to the first and second motor control circuits, the first and second switching devices each having:

a normal state whereby the first and second motor control circuits are in a normal operating mode;

a first power-fail state in which the PWM signal is transmitted to the first motor control circuit whereby current generated by the motion of the first motor is selectively sunk in accordance with the transmitted PWM signal following a state transition path having an initial state corresponding most closely to the present tape profile, thereby creating a decelerating force while substantially maintaining an initial tape tension; and a second power-fail state in which the PWM signal is transmitted to the second motor control circuit whereby current generated by the motion of the second motor is selectively sunk in accordance with the transmitted PWM signal following a state transition path having an initial state corresponding most closely to the present tape profile, thereby creating a decelerating force while substantially maintaining the initial tape tension.

10. The tape drive of claim 9, further comprising a microprocessor coupled to the control register and operable to transmit the control signals to the control register.

11. The tape drive of claim 10, the control signals further comprising an enable signal to trigger dynamic braking of the tape supply motor in the absence of a low power event.

12. The tape drive of claim 9, further comprising:

a microprocessor to transmit the control signals; and a buffer coupled between the microprocessor and the PWM state device for protecting contents of the control register against alteration in the event of a low power event.

13. A method for dynamic braking of a DC motor in a tape drive, comprising:

storing a plurality of state transition paths into a pulse width modulation (PWM) state device, each path having an initial state representative of a tape profile, including a predetermined range of tape velocities, relative amounts of tape on each reel, an initial tape tension between a supply reel and a take-up reel, and at least one subsequent state;

operating a DC motor in a normal mode;

monitoring at least one voltage coupled to provide power to a motor control circuit;

receiving a profile signal representative of a current tape profile;

receiving a power-fail signal;

transmitting the profile signal into a pulse width modulation (PWM) state device;

comparing the then-current tape profile to a plurality of predetermined ranges of tape velocities, relative amounts of tape on each reel and a tape tension;

selecting from the plurality of state transition paths the state transition path having an initial state which includes the then-current tapeprofile;

transmitting a PWM signal to the motor control circuit, the PWM signal responsive to the selected state transition path;

wherein current generated by the motion of the DC motor is selectively sunk in accordance with the transmitted PWM signal, thereby creating a decelerating force while substantially maintaining the then-current tape tension.

14. The method of claim 13, further comprising receiving an enable signal to trigger dynamic braking of the DC motor in the absence of a low power event.

15. The method of claim 13, further comprising buffering the PWM state device to protect the contents against alteration in the event of a low power event.

16. The method of claim 13, wherein the PWM signal modulates power switches in the motor control circuit associated with windings of the DC motor.

* * * * *

UNITED STATES PATENT AND TRADEMARK OFFICE
CERTIFICATE OF CORRECTION

PATENT NO. : 6,819,065 B1
DATED : November 16, 2004
INVENTOR(S) : Howarth, James J. et al.

It is certified that error appears in the above-identified patent and that said Letters Patent is hereby corrected as shown below:

<u>Title page,</u>
Item [54], Title, should read -- DYNAMIC BRAKING OF TAPE DRIVE MOTOR --

Signed and Sealed this

Fourteenth Day of June, 2005

JON W. DUDAS
*Director of the United States Patent and Trademark Office*